US012578122B2

(12) United States Patent
Ling et al.

(10) Patent No.: US 12,578,122 B2
(45) Date of Patent: Mar. 17, 2026

(54) FLAT HEAT ABSORBER FOR SOLAR TOWER POWER GENERATION AND SYSTEM USING SAME

(71) Applicant: NANJING TECH UNIVERSITY, Nanjing (CN)

(72) Inventors: Xiang Ling, Nanjing (CN); Mingsheng Du, Nanjing (CN); Changtian Liu, Nanjing (CN); Juan Zhao, Nanjing (CN)

(73) Assignee: NANJING TECH UNIVERSITY, Nanjing (CN)

( * ) Notice: Subject to any disclaimer, the term of this patent is extended or adjusted under 35 U.S.C. 154(b) by 427 days.

(21) Appl. No.: 18/270,355

(22) PCT Filed: May 8, 2021

(86) PCT No.: PCT/CN2021/092260
§ 371 (c)(1),
(2) Date: Jun. 29, 2023

(87) PCT Pub. No.: WO2022/151618
PCT Pub. Date: Jul. 21, 2022

(65) Prior Publication Data
US 2024/0110729 A1 Apr. 4, 2024

(30) Foreign Application Priority Data

Jan. 13, 2021 (CN) .......................... 202110043689.6

(51) Int. Cl.
*F24S 20/20* (2018.01)
*F24S 10/50* (2018.01)
*F24S 10/95* (2018.01)

(52) U.S. Cl.
CPC ............. *F24S 20/20* (2018.05); *F24S 10/502* (2018.05); *F24S 10/95* (2018.05)

(58) Field of Classification Search
CPC ................................. F24S 10/95; F24S 20/20
See application file for complete search history.

(56) References Cited

U.S. PATENT DOCUMENTS 4,135,367 A * 1/1979 Frosch .................... F03G 6/071
60/512
4,273,100 A * 6/1981 Cogliano ................ F28D 15/06
165/104.11

(Continued)

FOREIGN PATENT DOCUMENTS

CN 201414093 Y 2/2010
CN 103017367 A * 4/2013 ............. F24S 20/20

(Continued)

*Primary Examiner* — Jorge A Pereiro
(74) *Attorney, Agent, or Firm* — MUNCY, GEISSLER, OLDS & LOWE, P.C.

(57) ABSTRACT

A novel flat heat absorber for solar tower power generation and a system using same. The system includes a windshield, a flat heat absorber, and a circulation pipeline. The flat heat absorber is for photothermal conversion and heat energy transfer, the windshield prevents heat loss of the heat absorber, and the circulation pipeline ensures the circulation of a working fluid. In a working process, a heat transfer fluid in the flat heat absorber absorbs heat and evaporates from an evaporation surface, releases heat and condenses on a condensation surface, the condensed heat transfer fluid flows back to the evaporation surface to enter circulation work of a next round, and heat is transferred to the working fluid by means of a gas-liquid phase change process.

9 Claims, 6 Drawing Sheets

(56) References Cited

U.S. PATENT DOCUMENTS 4,437,456 A * 3/1984 Merrigan ................ F24S 10/30
126/645
9,400,121 B2 * 7/2016 Fakih ...................... F24S 50/20

FOREIGN PATENT DOCUMENTS

| CN | 210119023 U | 2/2020 | |
| CN | 210179921 U | 3/2020 | |
| DE | 10251446 A1 * | 5/2004 | ............. H10F 77/68 |

* cited by examiner 2. 1. 1
2. 1. 2

2. 4. 1

2. 9

2. 10

∠θ

Through
hole 2. 7

3. 1. 1
3. 1. 2
3. 1. 3

3. 1. 4

Condensation section

Evaporation surface
adiabatic section
condensation surface

Adiabatic section

Focusing solar    Focusing solar

Evaporation section

Novel flat heat absorber    Typical heat pipe heat absorber

FLAT HEAT ABSORBER FOR SOLAR TOWER POWER GENERATION AND SYSTEM USING SAME

TECHNICAL FIELD

The present invention relates to a flat heat absorber suitable for solar tower power generation and a system using the same, falling within the technical field of solar high-temperature heat utilization.

BACKGROUND ART

In the 21$^{st}$ century, with the increasing depletion of fossil fuels and environmental pollution, energy has become a bottleneck of China's rapid economic development. As a kind of renewable energy with huge energy storage, clean environment protection and wide distribution, solar energy is becoming a hot spot in the field of energy research and development. The tower solar thermal power generation system has the advantages of high concentration ratio, high light-to-heat conversion efficiency and low power generation cost, which has been developed rapidly. However, the thermal absorber of tower solar thermal power generation system works under unsteady, non-uniform and high energy flow density thermal load, and there are some problems such as local overheating, thermal fatigue and thermal ratchet, which seriously affect the stability and reliability of the absorber, and have become a key technical problem affecting the performance of tower thermal power generation system. At the same time, in order to increase the concentration ratio, a wide heliostat field is required, and the heat absorber needs to be placed at a higher focal point of the heliostat field, thereby causing a larger windward area and a higher center of gravity relative to the ground, resulting in instability of the heat absorber and the central tower. With the focus position and heat absorption area unchanged, the heat absorption structure needs to be adjusted to solve the above problems.

The heat absorber is the core component of the tower solar thermal power generation system. The direct heat absorber has a huge temperature difference between the light-absorbing plate and the cold fluid, which causes the heat absorber to generate thermal stress and damage and reduces the service life. Conventional heat pipe heat absorbers require that the condensing section be located above the evaporating section so that the heat absorption has a higher center of gravity and volume for the same heat absorbing area.

SUMMARY OF THE INVENTION

It is an object of the present invention to provide a novel flat heat absorber for solar tower power generation, wherein the flat heat absorber has good temperature uniformity, low thermal stress, high heat transfer efficiency and a long service life, and can solve the problem that the service life of the existing heat absorber is too short due to local overheating and thermal fatigue under the heat load of non-steady state, non-uniformity and high energy flow density. At the same time, the flat heat absorber has a lower center of gravity and volume under the same heat absorption area, which can solve the problem that the height and center of gravity of the existing heat pipe type heat absorber are too high and the volume is too large.

It is also an object of the present invention to provide a system using the above flat heat absorber for solar tower power generation.

In order to solve the technical problem, the invention has the following technical solution:

a novel flat heat absorber for solar tower power generation comprises a light-absorbing plate, a metal fiber felt, a metal wire mesh, a grid, baffles, fins, and cover plates arranged from the outside to the inside, wherein an inlet pipe and an outlet pipe are provided on the cover plate, and a side face of the heat absorber is provided with seals to form a sealed environment; and a filling pipe passes through the baffles; the light-absorbing plate, the baffles, the seals and the filling pipe constitute a hot plate side having an interior being in a vacuum state and provided with a metal fiber felt, a metal wire mesh, a grid and a heat transfer fluid, and the heat transfer fluid enters through the filling pipe; the baffles, the fins, the seals, the cover plates, the inlet pipe and the outlet pipe constitute a heat exchange side, the working fluid flows through the heat exchange side via the inlet pipe and the outlet pipe, and the heat transfer fluid transfers heat energy to a circulating working fluid by means of indirect heat transfer using the heat pipe principle; the evaporation surface and the condensation surface of the heat transfer fluid in the heat absorber are on the same horizontal line.

Further, the heat transfer fluid absorbs heat from the light-absorbing plate and condenses and releases heat at the baffle, and the condensed heat transfer fluid flows back to the inner surface of the light-absorbing plate through the grid to enter the next cycle; the exothermic heat of condensation is transferred to the working fluid through the baffles and fins.

Further, the grid is attached to the condensation surface of the baffle by means of 3D printing or brazing and is inclined at an angle of 10 to 30 degrees from the condensation surface of the baffle to the evaporation surface of the light-absorbing plate, and the height direction of the grid extends to the surface of the metal wire mesh.

Further, the grid is provided as an inclined regular hexagonal frame, and the lowest position in the longitudinal direction is an edge of the frame; each edge face is provided with a through hole not exceeding an edge length of the frame at a position away from the condensation surface and the edge, and each regular hexagonal frame is in communication with the adjacent six regular hexagonal frames via the through hole; alternatively, the grid is provided as inclined triangular edges, and the triangular edges of the same layer are discontinuous, and the triangular edges of different layers are offset from each other.

Further, a plurality of horizontally arranged deflectors are further provided on the baffle, and the ends of adjacent deflectors are arranged in a staggered manner; the fins are zigzag fins, and form a heat exchange runner with multiple return strokes together with the deflectors in the interior of the heat exchange side; the inlet pipe and the outlet pipe are on an oblique diagonal of the heat exchange side, and the inlet pipe is above the outlet pipe; and the working fluid is air or supercritical carbon dioxide.

Further, the outer surface of the light-absorbing plate is coated with a high-temperature-resistant light-absorbing coating, and the inner surface is provided with a micro-pit surface; the metal fiber felt is closely adhered to the inner surface of the light-absorbing plate and is covered by the metal wire mesh, and the metal wire mesh and the metal fiber felt are spot-welded on an inner surface of the light-absorbing plate; the heat transfer fluid is a liquid metal, and the filling rate of the heat transfer fluid is 30%-50% of the volume of the hot plate side under working conditions; the material of the light-absorbing plate, the metal fiber felt, the metal wire mesh, the grid, the baffle, the seal, the thermo-couple tube and the filling pipe is stainless steel, high-temperature nickel-based alloy or titanium alloy.

Further, the heat absorber is further provided with a thermocouple tube, and the thermocouple tube and the filling pipe pass through the heat exchange side to the inside of the hot plate side; the filling pipe is pressed and sealed by welding at an end of the filling pipe after the heat transfer fluid is filled; the thermocouple tube is welded and sealed at the front end of the hot plate side with a sealing plate and a through pipe, a thermocouple is placed inside, the tempera-ture sensing point is in contact with the sealing plate, and the thermocouple tube is above the liquid level of the heat transfer fluid, and does not contact the metal wire mesh and grid.

A solar tower power generation system comprises a windshield, a circulation pipeline and a novel flat heat absorber for solar tower power generation, wherein the windshield encloses the flat heat absorber and the circulation pipeline, the circulation pipeline is provided inside the flat heat absorber, the flat heat absorbers are connected in parallel via the circulation pipeline, and each flat heat absorber is an independent light-absorbing heat transfer element.

Further, the windshield comprises a wind-proof cover plate and wind-proof blades arranged closely in parallel; the circulation pipeline comprises an inlet main branch pipe, an inlet annular pipe, an inlet main pipe, an outlet main branch pipe, an outlet annular pipe and an outlet main pipe, wherein the inlet annular pipe is provided with two inlet main pipes arranged opposite to each other, and the inlet annular pipe is vertically provided with a plurality of parallel inlet main branch pipes; the arrangement relationship among the outlet main branch pipe, the outlet annular pipe and the outlet main pipe is the same as the above-mentioned inlet main branch pipe, inlet annular pipe and inlet main pipe; the inlet annular pipe and the outlet annular pipe are parallel to each other, and the inlet main branch pipe and the outlet main branch pipe are arranged in one-to-one correspondence; the inlet main branch pipe comprises a branch pipe body, a branch pipe flange, a branch pipe branch and a branch pipe head, the structure of the outlet main branch pipe is the same as the above-mentioned inlet main branch pipe, and the branch pipe branch is connected to the inlet pipe and outlet pipe of the flat heat absorber via a thread or a flange, and can also serve as a bracket for fixing the flat heat absorber.

Further, the diameters of the inlet main branch pipe, the inlet annular pipe and the inlet main pipe are smaller than the diameters of the outlet main branch pipe, the outlet annular pipe and the outlet main pipe; the distance between the inlet main branch pipe and the outlet main branch pipe corre-sponding to the same flat heat absorber is greater than the thickness of the flat heat absorber.

Compared with the prior art, the present invention has the following advantages and effects:

The indirect heat transfer method based on the heat pipe principle can reduce the thermal stress, thermal deformation, thermal fatigue and extend the service life of the flat heat absorber due to the huge temperature difference by avoiding the direct heat exchange between the light-absorbing plate and the cold fluid.

As a heat transfer fluid, liquid metals have relatively low melting point, high boiling temperature and excellent heat transfer characteristics, allowing operation at higher heat flux intensity and higher working fluid outlet temperature; the capillary action of the metal fiber felt and the backflow action of the grid together make the liquid heat transfer fluid more evenly distributed on the evaporation sur-face, so that the light-absorbing plate has a better temperature equalization performance, avoiding local overheating and other problems;

the new flat heat absorber is easy to achieve standardiza-tion and modularization, and is connected in parallel through circulation pipeline. Each flat heat absorber is used as an independent light-absorbing heat transfer element, and is closely stacked into heat-absorbing screens on the top, bottom, left and right sides, and does not affect each other when working. The working state of the flat heat absorber is observed in real time through the thermocouple in the thermocouple tube, and can be replaced independently when there is damage, with better safety, easier maintenance and lower mainte-nance cost.

In summary, the novel flat heat absorber for solar tower power generation of the present invention conducts indirect heat transfer using the heat pipe principle, so that the light-absorbing plate of the flat heat absorber has good temperature equalization performance, can endure high heat flux and thermal shock, prevent the occurrence of local overheating and hot spots, and provide high-temperature and stable working fluid input for the power generation system. According to the present invention, a heat pipe principle is used, a liquid metal is used as a heat transfer fluid in the hot plate side of a flat heat absorber to improve the temperature uniformity of a heating surface and the efficiency of trans-ferring heat energy, and prolong the service life of the flat heat absorber while taking into account the processing use and maintenance and replacement of the heat absorber (in a practical solar tower system, the diameter and height thereof can reach several tens of meters or even several hundreds of meters, and therefore an elevator or the like is often provided inside a central tower to facilitate a working staff or a maintenance personnel to perform maintenance. It is there-fore emphasized that the distance between the inlet main branch pipe and the outlet main branch pipe corresponding to the same flat heat absorber is larger than the thickness of the flat heat absorber, which needs to be considered when designing the flat heat absorber. When replacing, the con-necting flange and fixing device of the inlet and outlet pipes of the flat heat absorber can be removed, and the connecting flange and fixing device can be recycled from between the inlet and outlet main branch pipes to the carrier and a new flat heat absorber can be replaced) to solve the problem of high cost of large-scale maintenance in a modular assembly manner.

In addition, it can be seen from the working principle and height comparison diagram of the heat absorber in FIG. 12 that the conventional heat pipe heat absorber needs to place the condensation section above the evaporation section, and the condensed liquid heat transfer fluid flows back to the evaporation section along the wall surface, so that the evaporation section has better temperature equalization per-formance. However, the condensation section and the evaporation section of the novel flat heat absorber provided in the present invention are at the same level, and the condensed liquid heat transfer fluid is returned to the evapo-ration surface by means of the combination of the reflux effect of the grid and the inlet position of the working fluid and the arrangement of the runners of the fins, and is distributed on the evaporation surface under the combination of the gravity effect and the capillary effect of the metal fiber felt to obtain better temperature equalization performance. Equivalent to the above conventional heat pipe heat absorber. Since the condensation section, the adiabatic section and the evaporation section of the novel flat heat absorber provided by the present invention are located at the same level, the height of the novel flat heat absorber is reduced by at least half compared to the conventional heat pipe heat absorber while maintaining the same heat absorption area. Thus, the center of gravity of the absorber and the center of gravity of the center tower both move downward, and the windward area of the absorber is reduced by half. Under the same wind conditions, the fixing devices of the heat absorber and the central tower bear less force, improving the stability and safety of the heat absorber and the central tower, and reducing the steel consumption and production cost.

DETAILED DESCRIPTION OF THE INVENTION

For the purpose of further illustrating the inventive content, features and functions of the present invention, reference will now be made in detail to the embodiments that are illustrated in the accompanying drawings, and the invention is not limited to these embodiments.

Figure 1:
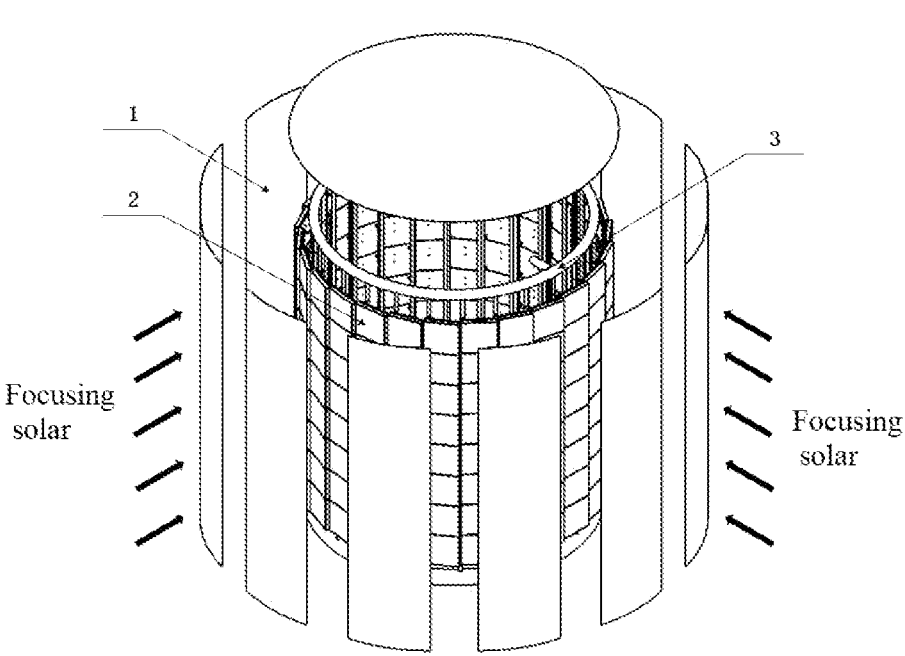
FIG. 1 is a diagram of a novel flat heat absorber and a system thereof according to the present invention.
Figure 4:
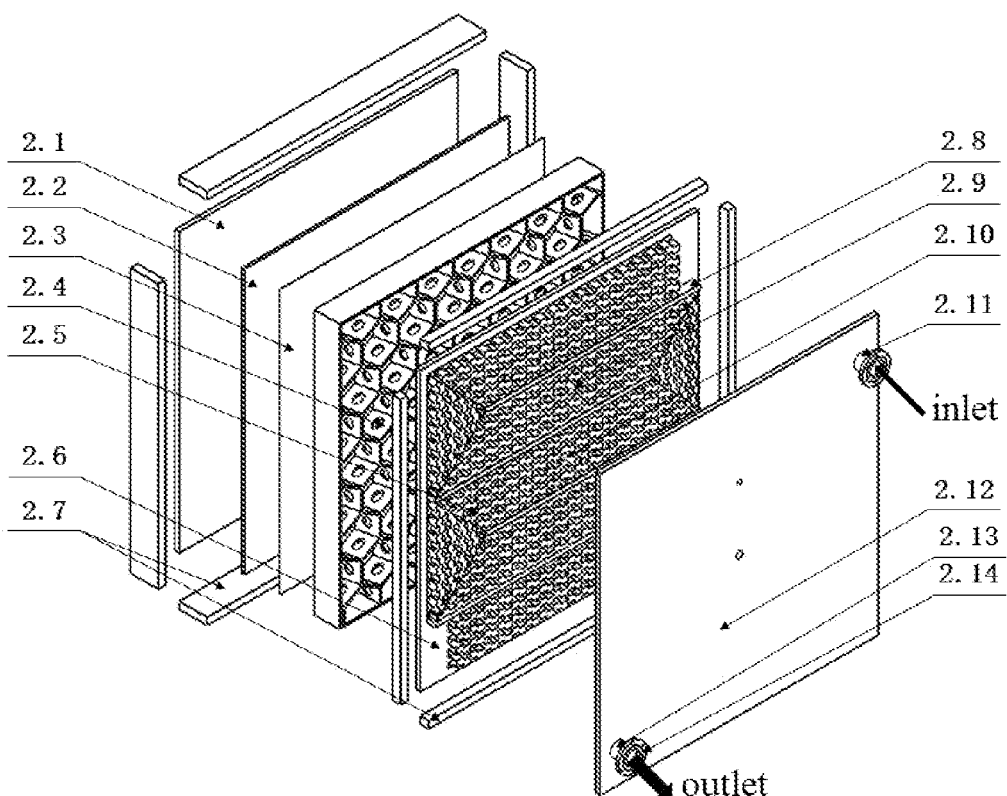
FIG. 4 is an exploded diagram of the novel flat heat absorber according to the present invention.

As shown in FIGS. 1 and 4, a novel flat heat absorber for solar tower power generation and a system using the same includes a windshield 1, a flat heat absorber 2, and a circulation pipeline 3. The heat pipe principle is used to conduct indirect heat transfer in the flat heat absorber 2 to achieve better temperature equalization performance of the light-absorbing plate 2.1. In the working process, the focused solar energy with a high energy flow density penetrates through a windshield 1, irradiates on the light-absorbing plate 2.1 of the flat-plate heat absorber 2, and is absorbed and converted into heat energy by a light-absorbing coating 2.1.1, and is transferred to the inner evaporation surface of the light-absorbing plate 2.1 via the light-absorbing plate 2.1; after absorbing heat, the heat transfer fluid evaporates and vaporizes; a large amount of heat is carried by the steam and is exothermically condensed on the condensation surface of a baffle 2.6; on the one hand, the condensate flows back to a metal fiber felt 2.2 and a metal wire mesh 2.3 along the direction of the inclination of a grid 2.4; the capillary action of the metal fiber felt 2.2 and the reflux action of the grid 2.4 enable the liquid heat transfer fluid to be distributed on the inner evaporation surface of the light-absorbing plate 2.1; on the other hand, the heat released by condensation is transferred to the heat exchange surfaces of fins 2.5 and the baffle 2.6 via the fins 2.5 and the baffle 2.6; and the working fluid flows through the fins 2.5 and the baffle 2.6 and absorbs the heat into a circulation pipeline 3. The heat pipe has excellent isothermal performance and thermal conductivity, and the indirect heat transfer mode provides better temperature equalization performance of the light-absorbing plate 2.1.

Figure 3:
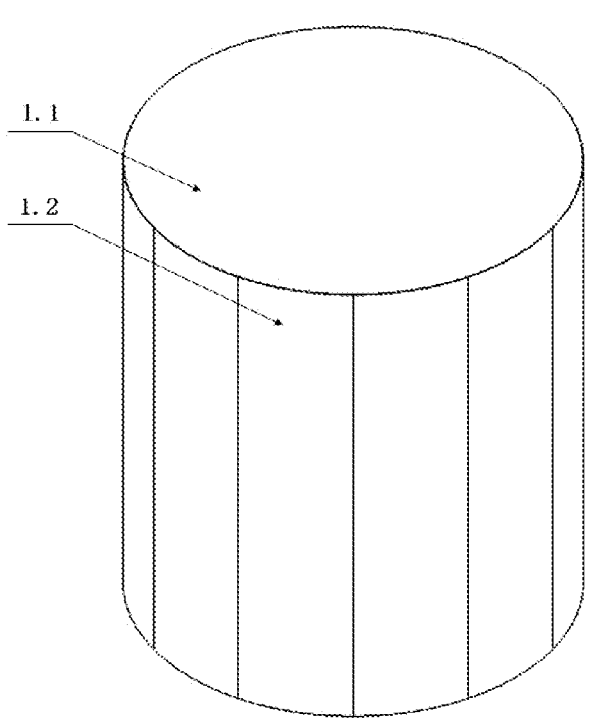
FIG. 3 is an external diagram of the windshield according to the present invention.

As shown in FIGS. 1 and 3, the windshield 1 is made of glass or reinforced plastic with high light transmission, low thermal conductivity, high-temperature resistance, low density and high strength, and comprises closely arranged wind-proof blades 1.1 and a wind-proof cover plate 1.2, and a flat heat absorber 2 and a circulation pipeline 3 are enclosed therein. The wind-proof blades 1.1 avoid heat losses due to air flow in the horizontal direction, and the wind-proof cover plates 1.2 avoid heat losses due to axial convection caused by the high-temperature plate heat absorber 2.

As shown in FIG. 4, the flat heat absorber 2 comprises a light-absorbing plate 2.1, a metal fiber felt 2.2, a grid 2.4, a heat transfer working medium (a heat transfer fluid), fins 2.5 and a working fluid, etc. and uses a gas-liquid phase change process of the heat transfer working medium to provide rapid heat transfer. The phase change process of heat transfer working fluid can realize the rapid transfer of large heat flow and has high heat conduction capacity.

Figure 5:
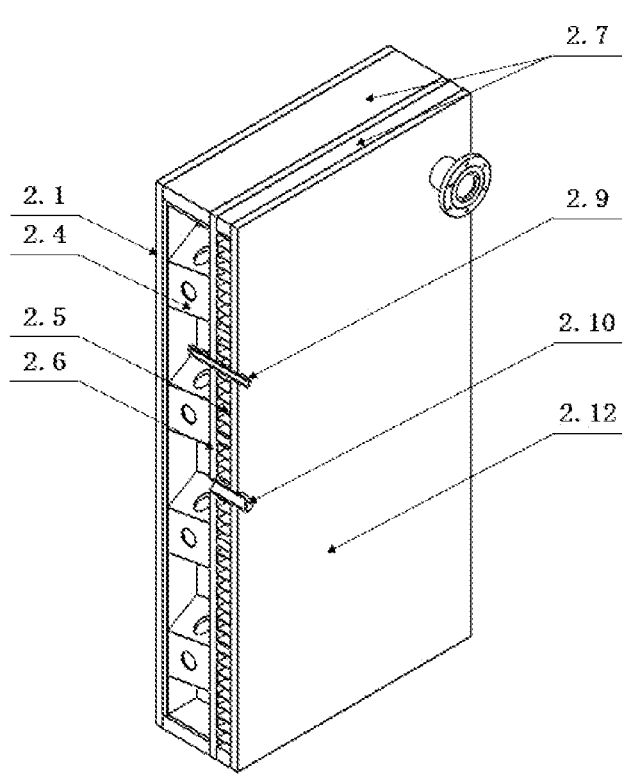
FIG. 5 is an intermediate longitudinal sectional diagram of the novel flat heat absorber according to the present invention.

As shown in FIGS. 4 and 5, the light-absorbing plate 2.1, together with the baffle 2.6, the seal 2.7, the thermocouple tube 2.9 and the filling pipe 2.10 constitute a hot plate side, the inside of the hot plate side is in a vacuum state, and comprises a metal fiber felt 2.2, a metal wire mesh 2.3, a grid 2.4 and a heat transfer fluid. In addition, the fins 2.5 form a heat exchange side with the baffle 2.6, the seal 2.7, the inlet pipe 2.11, the cover plate 2.12, the outlet pipe 2.13 and the heat absorber flange 2.14, and the working fluid flows through the heat exchange side through the inlet pipe 2.11, the outlet pipe 2.13 and the heat absorber flange 2.14. On one hand, the vacuum environment on the hot plate side can avoid the influence of non-condensable gas on the performance of the hot plate side, on the other hand, it can also avoid the deterioration reaction such as oxidation of the heat transfer fluid.

Figure 6:
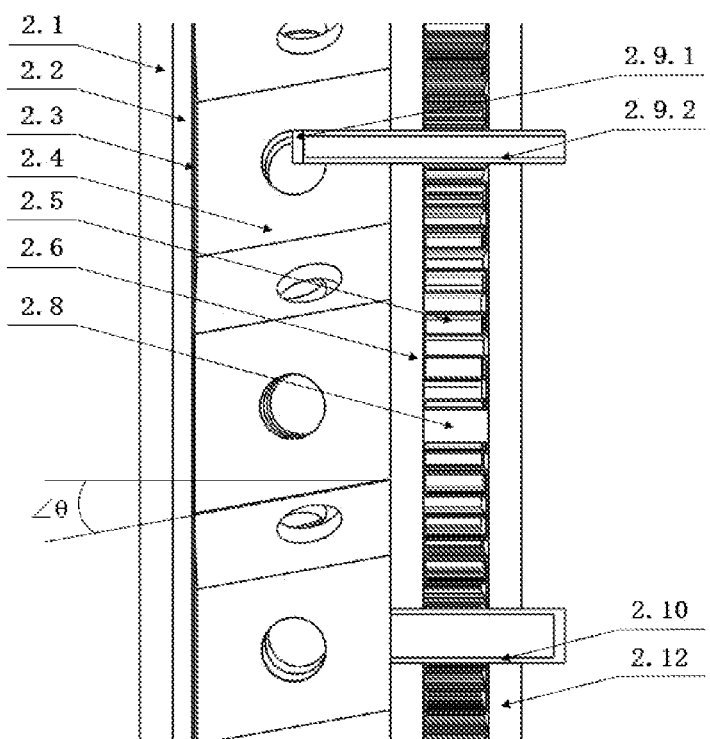
FIG. 6 is an enlarged mid-longitudinal sectional diagram of the novel flat heat absorber according to the present invention.
Figure 7:
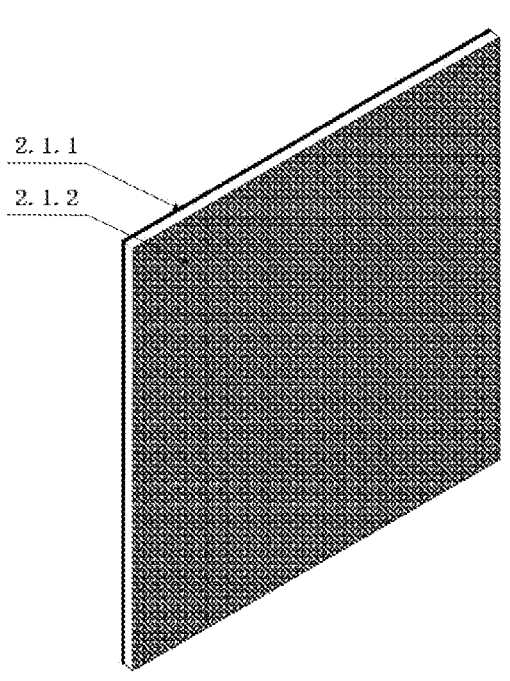
FIG. 7 is an external diagram of a light-absorbing plate of the novel flat heat absorber according to the present invention.

As shown in FIGS. 6 and 7, the outer surface of the light-absorbing plate 2.1 is coated with a high-temperature-resistant light-absorbing coating 2.1.1, such as a P1501 (Ni—Mo-based) metal coating material or a P2712 (Co—WC-based) metal-ceramic coating material developed by Cheng Xudong of Wuhan University of Technology, and the inner surface of the light-absorbing plate 2.1 is formed with a micro-pit surface 2.1.2 by a process such as laser etching. The shape, diameter, depth and spacing of the micro-pits can be optimized according to the latest research results, for example, the aperture provided by Chatpun is about 10 μm, the aperture is about 3 mm, and the hole depth provided by Hutter has little effect. The metal fiber felt 2.2 inside the hot plate side is closely adhered to the inner surface of the light-absorbing plate 2.1, and is covered by the metal wire mesh 2.3, and the metal wire mesh 2.3 and the metal fiber felt 2.2 are spot-welded on the inner surface of the light-absorbing plate 2.1 using a nickel sheet, and the position of the spot-welding corresponds to the position of the center of the regular hexagonal frame 2.4.1 of the grid 2.4; the grid 2.4 is directly connected to the condensation surface of the baffle 2.6 using a processing technique such as 3D printing or soldering, and is inclined at a certain angle θ (10°-30°) from the condensation surface to the evaporation surface, and extends to the surface of the metal wire mesh 2.3; the filling rate of the heat transfer fluid is 30%-50% of the volume of the hot plate side under the working condition.

The micro-pit surface 2.1.2 of the light-absorbing plate 2.1 can provide more boiling cores for the evaporation of the heat transfer fluid, and enhance the evaporation or boiling heat transfer; the metal fiber felt 2.2 and the metal wire mesh 2.3 can be more tightly attached to the inner surface of the light-absorbing plate 2.1 by using nickel sheet spot welding, and the spot welding is performed on the position corresponding to the center of the regular hexagonal frame 2.4.1 of the grid 2.4, and the metal fiber felt 2.2 and the metal wire mesh 2.3 can be expanded and bulged on the regular hexagonal frame 2.4.1 to better absorb the liquid heat transfer working medium flowing back along the edge; the grid 2.4 is directly connected to the baffle 2.6, which is equivalent to expanding the condensation surface area and enhancing the condensation, and at the same time can also prevent the condensed liquid heat transfer working medium from flowing to the bottom of the hot plate side along the condensation surface; the inclination angle θ of the grid 2.4 can enable the condensed liquid heat transfer working medium to return to the metal mesh 2.3 more quickly and avoid accumulation in the grid 2.4; the filling rate of heat transfer fluid needs to be selected according to the working conditions, too little of the fluid will lead to drying up and thus overheating, while too much of the fluid will reduce the region of phase change heat transfer and lose the advantages of heat pipe.

Figure 8:
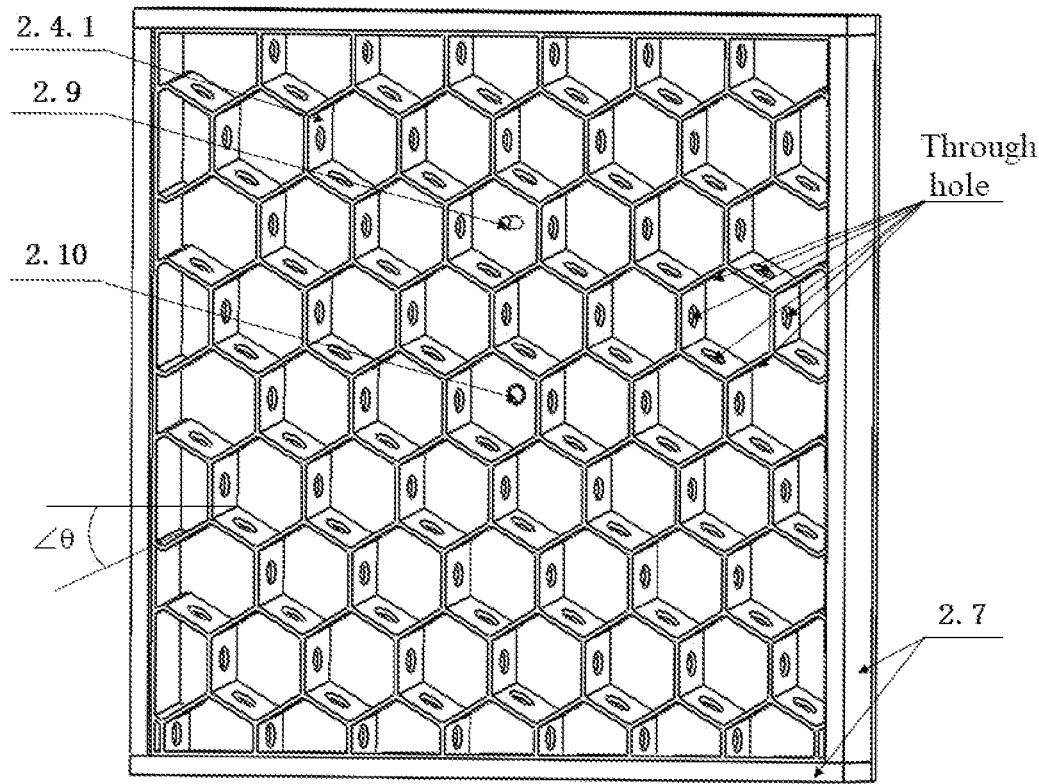
FIG. 8 is an external diagram of a hexagonal grid of the novel flat heat absorber according to the present invention.
Figure 9:
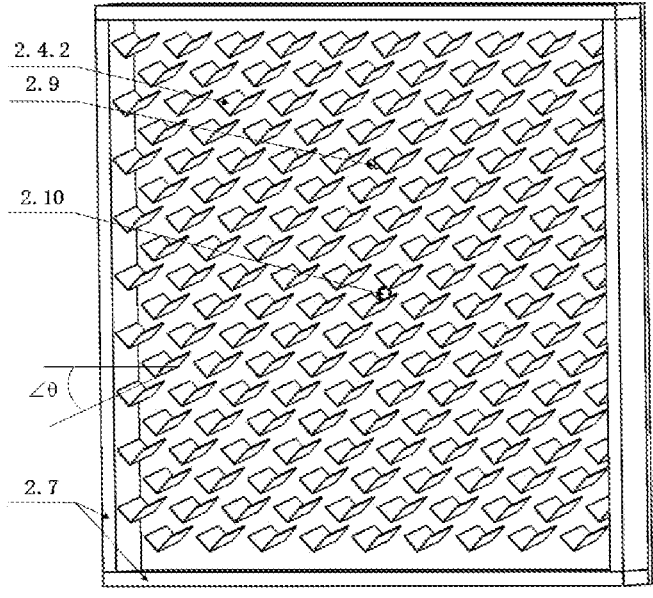
FIG. 9 is an external diagram of a triangular edge grid of the novel flat heat absorber according to the present invention.

As shown in FIGS. 8 and 9, for example, the grid 2.4 is an inclined regular hexagonal frame 2.4.1, and the lowest position in the longitudinal direction is an edge of the frame (an edge presented by the regular hexagonal frame in a three-dimensional space can be a regular hexagon when viewed from the cross section thereof, and the edge corresponds to a regular hexagonal corner point, and two corner points corresponding to the regular hexagon are required to be at the highest point and the lowest point, and the highest point and the lowest point cannot be replaced by an edge, i.e., an edge face of the regular hexagonal frame in the three-dimensional space); each edge face is provided at a position away from the condensation surface and the edge with a through hole not exceeding an edge length of the frame, and each regular hexagonal frame 2.4.1 communicates with the adjacent six regular hexagonal frames 2.4.1 via the through hole.

For example, the grid 2.4 or inclined triangular edges 2.4.2 can be used, the triangular edges 2.4.2 of the same layer are not continuous, and the triangular edges 2.4.2 of different layers are staggered from each other. Both the regular hexagonal frame 2.4.1 and the triangular edges 2.4.2 are designed so that the condensed liquid heat transfer fluid flows back to the corresponding position of the evaporation surface. The flow velocity of the condensed heat transfer fluid along the edge of the regular hexagonal frame 2.4.1 is greater than the flow velocity along the edge surface of the regular hexagonal frame 2.4.1; the pressure balance in the hot plate side can be ensured by the through holes, and the heat transfer fluid vapor can flow freely to the low pressure region where the condensation effect is more obvious, and the staggered positions of triangular edges 2.4.2 are based on the above considerations of flow velocity and pressure balance.

As shown in FIG. 4, the heat transfer fluid is a liquid metal, such as sodium, potassium, cesium, lithium, sodium potassium alloys, etc. The materials of the light-absorbing plate 2.1, the metal fiber felt 2.2, the metal wire mesh 2.3, the grid 2.4, the baffle 2.6, the seal 2.7, the thermocouple tube 2.9 and the filling pipe 2.10 are materials compatible with the heat transfer fluid, such as stainless steel, high-temperature nickel-based alloy or titanium alloy. Liquid metals have higher boiling temperatures and excellent heat transfer characteristics, allowing operation at higher heat flux strengths, achieving higher working fluid outlet temperatures, but with compatibility requirements for the encapsulated materials.

As shown in FIG. 6, the thermocouple tube 2.9 and the filling pipe 2.10 pass through the heat exchange side to the inside of the hot plate side; the filling pipe 2.10 is pressed dead and welded sealed at the end of the filling pipe 2.10 after the heat transfer fluid is filled. The thermocouple tube 2.9 is welded and sealed at the front end of the hot plate side with the sealing plate 2.9.1 and the through pipe 2.9.2, a thermocouple is placed inside, the temperature sensing point is in contact with the sealing plate 2.9.1, the thermocouple tube 2.9 is above the liquid level of the heat transfer fluid, and does not contact the metal wire mesh 2.3 and the grid 2.4. The thermocouple tube 2.9 and the filling pipe 2.10 both protrude from the heat exchange side, and can ensure the integrity of the light-absorbing plate 2.1, and can make the seal 2.7 flat, so that the flat heat absorber 2 is assembled as a heat absorbing screen at the top, bottom, left and right; the thermocouple in the thermocouple tube 2.9 measures the saturation temperature of the heat transfer fluid vapor as a basis for determining the operating state and damage of the flat heat absorber 2.

As shown in FIG. 4, the fins 2.5 are zigzag fins, and together with the deflector 2.8, a heat exchange runner with multiple return strokes is formed inside the heat exchange side, and in FIG. 4, it is a heat exchange runner arrangement with a single runner and five return strokes; at the same time, it is required that the return strokes of the heat exchange runner must be arranged in a horizontal direction, and cannot be arranged in a vertical direction to ensure that the temperature of the baffle changes in a vertical direction gradient, and the temperature of the horizontal runner at the upper-most part of the baffle is the lowest. The inlet pipe 2.11 and the outlet pipe 2.13 are on an oblique diagonal of the heat exchange side, and the inlet pipe 2.11 must be above the outlet pipe 2.13 and connected to the circulation pipeline 3 via a thread or a heat absorber flange 2.14; the working fluid is a working fluid such as air or supercritical carbon dioxide.

The multi-pass heat exchange runner can extend the heat exchange time of the working fluid and increase the outlet temperature of the working fluid. The inlet pipe 2.11 is above the outlet pipe 2.13, so that the upper part of the condensation surface has a lower temperature, more heat transfer fluid is condensed, and more liquid heat transfer fluid flows back to the upper parts of the metal fiber felt 2.2 and the metal wire mesh 2.3, and the upper part of the light-absorbing plate 2.1 has more heat transfer fluid under the combined influence of gravity and capillary action; the outlet pipe 2.13 is below, and the temperature of the liquid heat transfer fluid in the lower part can be increased, so that more evaporation boiling thereof generates heat transfer fluid vapor; under the combined action of the above two points, the liquid heat transfer fluid distributed on the surface of the light-absorbing plate 2.1 can be more uniform, the temperature difference of the light-absorbing plate 2.1 is smaller, and the temperature uniformity performance is better; after being connected with the circulation pipeline 3 via a thread or a flange, it can be more convenient to disassemble and expand; the working fluid can be exchanged for various working fluids according to the requirements of the power generation system.

Figure 10:
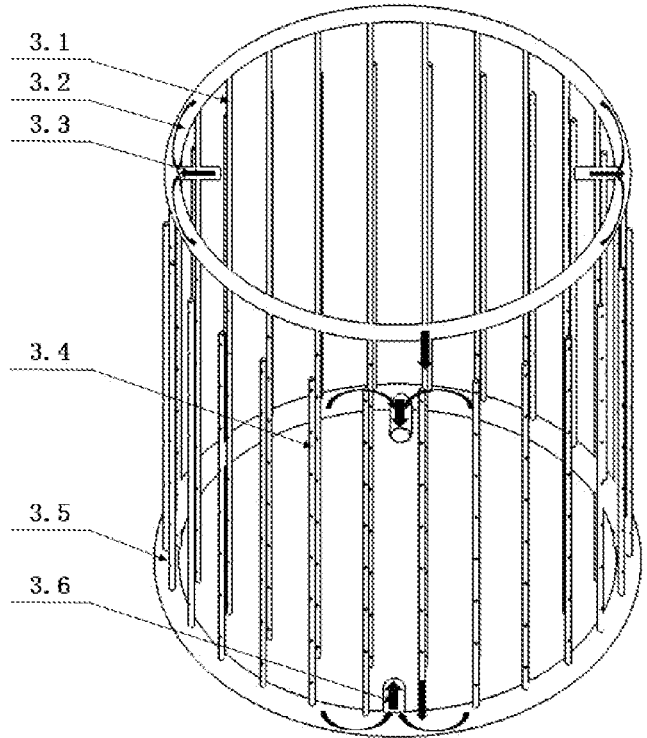
FIG. 10 is a diagram of the circulation pipeline profile and flow path according to the present invention.
Figure 11:
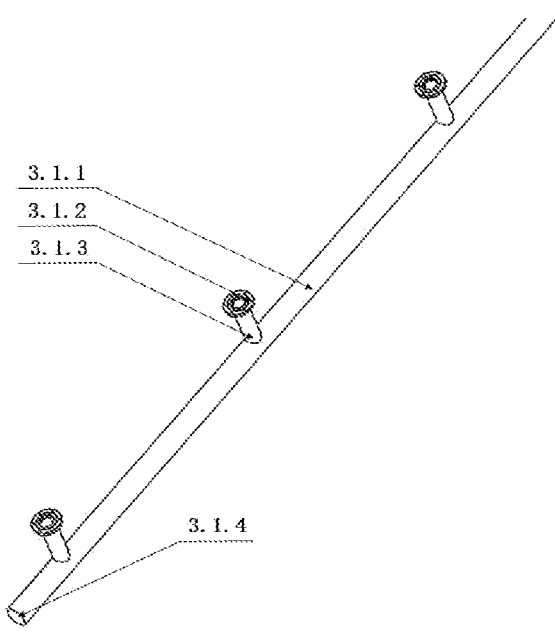
FIG. 11 is an enlarged partial diagram of the inlet main pipe of the circulation circuit according to the present invention.
Figure 12:
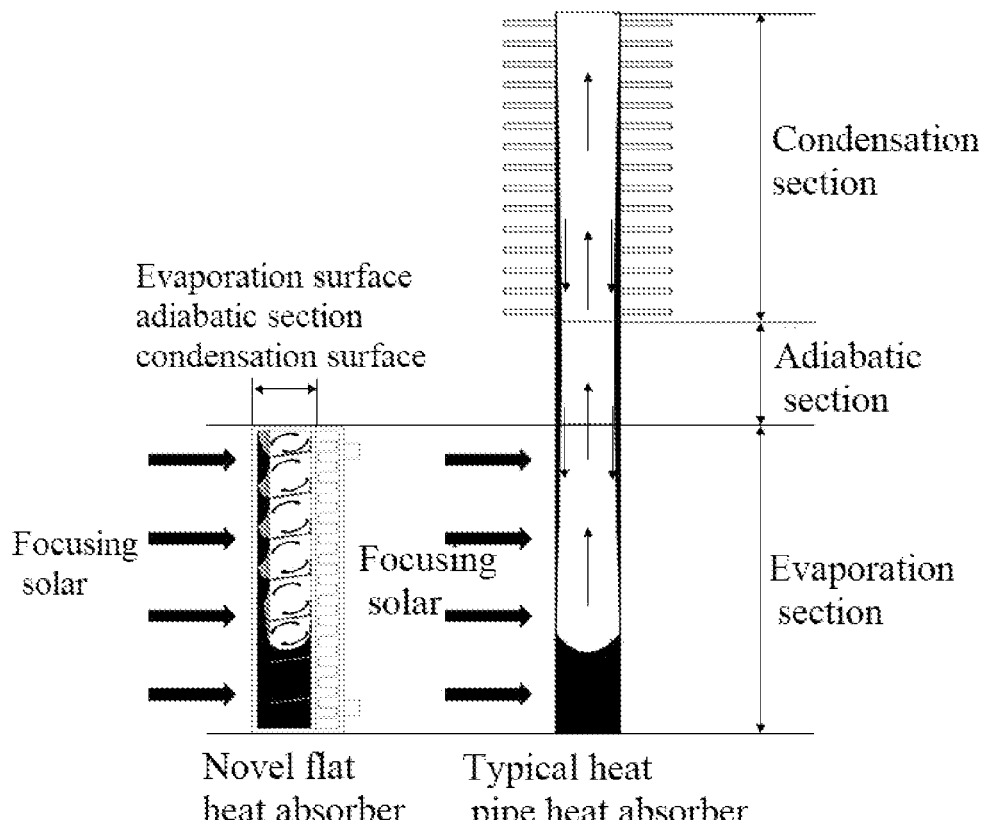
FIG. 12 is a graph comparing the working principle and height of the heat absorber.

As shown in FIGS. 10 and 11, the circulation pipeline 3 is composed of an inlet main branch pipe 3.1, an inlet annular pipe 3.2, an inlet main pipe 3.3, an outlet main branch pipe 3.4, an outlet annular pipe 3.5 and an outlet main pipe 3.6, wherein the inlet annular pipe 3.2 is provided with two inlet main pipes 3.3 arranged opposite to each other, and the inlet annular pipe 3.2 is vertically provided with a plurality of parallel inlet main branch pipes 3.1; the arrangement relationship of the outlet main branch pipe 3.4, the outlet annular pipe 3.5 and the outlet main pipe 3.6 is the same as the above-mentioned inlet main branch pipe 3.1, the inlet annular pipe 3.2 and the inlet main pipe 3.3. The inlet annular pipe 3.2 and the outlet annular pipe 3.5 are parallel to each other, and the inlet main branch pipe 3.1 and the outlet main branch pipe 3.4 are arranged in one-to-one correspondence.

The diameters of all the outlet pipelines are greater than the diameters of the inlet pipelines (the diameters of the inlet main branch pipe 3.1, the inlet annular pipe 3.2 and the inlet main pipe 3.3 are smaller than the diameters of the outlet main branch pipe 3.4, the outlet annular pipe 3.5 and the outlet main pipe 3.6); the inlet main branch pipe 3.1 comprises a branch pipe body 3.1.1, a branch pipe flange 3.1.2, a branch pipe 3.1.3 branch and a branch pipe head 3.1.4, and the structure of the outlet main branch pipe 3.4 is the same as the above-mentioned inlet main branch pipe 3.1; and the branch pipe 3.1.3 is connected to the inlet pipe 2.11 of the flat heat absorber 2 via a thread or a flange, and can also serve as a bracket for fixing the flat heat absorber 2.

It is required that the distance between the inlet main branch pipe 3.1 and the outlet main branch pipe 3.4 corresponding to the same flat heat absorber 2 is greater than the thickness of the flat heat absorber 2. The diameter of the outlet pipeline is larger than that of the inlet pipeline because of the higher outlet temperature, the expansion of the working fluid and the avoidance of vibration caused by the excessive flow velocity in the outlet pipeline; the circulation pipeline 3 serves as an auxiliary support for fixing the flat heat absorber, so that the safety of the external hanging installation of the flat heat absorber 2 can be improved; the distance between the inlet main branch pipe 3.1 and the outlet main branch pipe 3.4 is greater than the thickness of the flat heat absorber 2, so that the flat heat absorber 2 can be easily disassembled and assembled from the tower inside the tower solar system.

Figure 2:
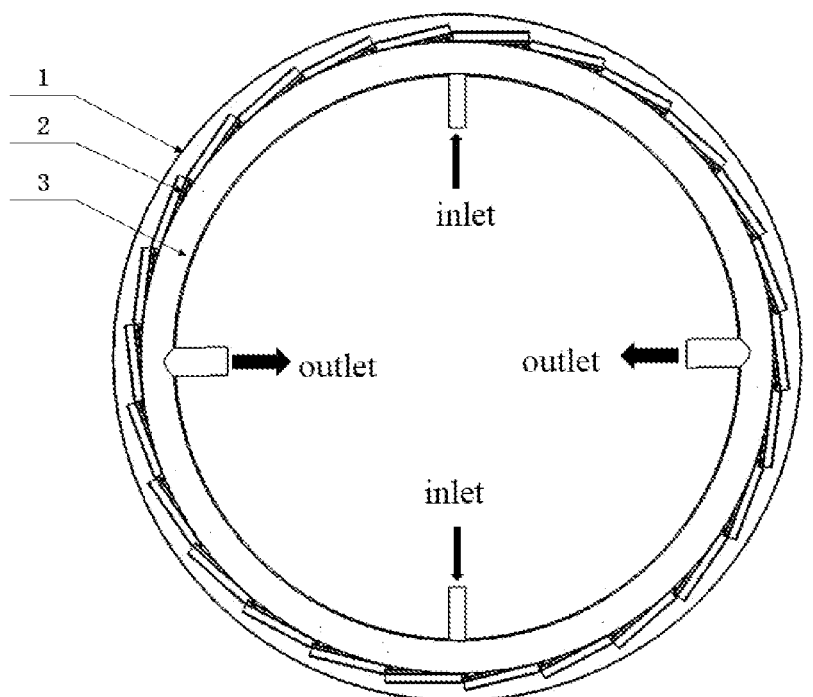
FIG. 2 is a bottom diagram of the novel flat heat absorber and the system thereof according to the present invention.

As shown in FIGS. 1 and 2, a plurality of flat absorbers 2 are connected in parallel via a circulation pipeline 3, and each flat heat absorber 2 serves as an independent light-absorbing heat transfer element, and is stacked closely up, down, left and right to form a heat-absorbing screen, which do not affect each other during operation and can be replaced independently when damaged. The parallel type heat absorption screen has higher stability and safety during operation, and also enables the flat heat absorber 2 to be miniaturized and modularized, with lower processing and maintenance costs.

The invention claimed is:

1. A flat heat absorber for solar tower power generation, comprising a light-absorbing plate, a metal fiber felt, a metal wire mesh, a grid, baffles, fins, and cover plates arranged from the outside to the inside, wherein an inlet pipe and an outlet pipe are provided on the cover plate, and a side face of the heat absorber is provided with seals to form a sealed environment; and a filling pipe passes through the baffles;

the light-absorbing plate, the baffles, the seals and the filling pipe constitute a hot plate side having an interior being in a vacuum state and provided with a metal fiber felt, a metal wire mesh, a grid and a heat transfer fluid, and the heat transfer fluid enters through the filling pipe; the baffles, the fins, the seals, the cover plates, the inlet pipe and the outlet pipe constitute a heat exchange side, the working fluid flows through the heat exchange side via the inlet pipe and the outlet pipe, and the heat transfer fluid transfers heat energy to a circulating working fluid by means of indirect heat transfer using the heat pipe principle; the evaporation surface and the condensation surface of the heat transfer fluid in the heat absorber are on the same horizontal line;

wherein the grid is attached to the condensation surface of the baffle by means of 3D printing or brazing and is inclined at an angle of 10 to 30 degrees from the condensation surface of the baffle to the evaporation surface of the light-absorbing plate, and the height direction of the grid extends to the surface of the metal wire mesh.

2. The flat heat absorber for solar tower power generation according to claim 1, wherein the heat transfer fluid absorbs heat from the light-absorbing plate and condenses and releases heat at the baffle, and the condensed heat transfer fluid flows back to the inner surface of the light-absorbing plate through the grid to enter the next cycle; the exothermic heat of condensation is transferred to the working fluid through the baffles and fins.

3. The flat heat absorber for solar tower power generation according to claim 1, wherein the grid is provided as an inclined regular hexagonal frame, and the lowest position in the longitudinal direction is an edge of the frame; each edge face is provided with a through hole not exceeding an edge length of the frame at a position away from the condensation surface and the edge, and each regular hexagonal frame is in communication with the adjacent six regular hexagonal frames via the through hole;

alternatively, the grid is provided as inclined triangular edges, and the triangular edges of the same layer are discontinuous, and the triangular edges of different layers are offset from each other.

4. The flat heat absorber for solar tower power generation according to claim 1, wherein the outer surface of the light-absorbing plate is coated with a high-temperature-resistant light-absorbing coating, and the inner surface is provided with a micro-pit surface;

the metal fiber felt is closely adhered to the inner surface of the light-absorbing plate and is covered by the metal wire mesh, and the metal wire mesh and the metal fiber felt are spot-welded on an inner surface of the light-absorbing plate;

the heat transfer fluid is a liquid metal, and the filling rate of the heat transfer fluid is 30%-50% of the volume of the hot plate side under working conditions;

the material of the light-absorbing plate, the metal fiber felt, the metal wire mesh, the grid, the baffle, the seal, the thermocouple tube and the filling pipe is stainless steel, high-temperature nickel-based alloy or titanium alloy.

5. The flat heat absorber for solar tower power generation according to claim 1, wherein the heat absorber is further provided with a thermocouple tube, and the thermocouple tube and the filling pipe pass through the heat exchange side to the inside of the hot plate side; the filling pipe is pressed and sealed by welding at an end of the filling pipe after the heat transfer fluid is filled; the thermocouple tube is welded and sealed at the front end of the hot plate side with a sealing plate and a through pipe, a thermocouple is placed inside, the temperature sensing point is in contact with the sealing plate, and the thermocouple tube is above the liquid level of the heat transfer fluid, and does not contact the metal wire mesh and grid.

6. A flat heat absorber for solar tower power generation, comprising a light-absorbing plate, a metal fiber felt, a metal wire mesh, a grid, baffles, fins, and cover plates arranged from the outside to the inside, wherein an inlet pipe and an outlet pipe are provided on the cover plate, and a side face of the heat absorber is provided with seals to form a sealed environment; and a filling pipe passes through the baffles;

wherein the light-absorbing plate, the baffles, the seals and the filling pipe constitute a hot plate side having an interior being in a vacuum state and provided with a metal fiber felt, a metal wire mesh, a grid and a heat transfer fluid, and the heat transfer fluid enters through the filling pipe; the baffles, the fins, the seals, the cover plates, the inlet pipe and the outlet pipe constitute a heat exchange side, the working fluid flows through the heat exchange side via the inlet pipe and the outlet pipe, and the heat transfer fluid transfers heat energy to a circulating working fluid by means of indirect heat transfer using the heat pipe principle; the evaporation surface and the condensation surface of the heat transfer fluid in the heat absorber are on the same horizontal line wherein a plurality of horizontally arranged deflectors are further provided on the baffle, and the ends of adjacent deflectors are arranged in a staggered manner; the fins are zigzag fins, and form a heat exchange runner with multiple return strokes together with the deflectors in the interior of the heat exchange side;

the inlet pipe and the outlet pipe are on an oblique diagonal of the heat exchange side, and the inlet pipe is above the outlet pipe; and the working fluid is air or supercritical carbon dioxide.

7. A solar tower power generation system, wherein the system comprises a windshield, a circulation pipeline and a flat heat absorber for solar tower power generation, the flat heat absorber for solar tower power generation comprising a light-absorbing plate, a metal fiber felt, a metal wire mesh, a grid, baffles, fins, and cover plates arranged from the outside to the inside, wherein an inlet pipe and an outlet pipe are provided on the cover plate, and a side face of the heat absorber is provided with seals to form a sealed environment; and a filling pipe passes through the baffles;

wherein the light-absorbing plate, the baffles, the seals and the filling pipe constitute a hot plate side having an interior being in a vacuum state and provided with a metal fiber felt, a metal wire mesh, a grid and a heat transfer fluid, and the heat transfer fluid enters through the filling pipe; the baffles, the fins, the seals, the cover plates, the inlet pipe and the outlet pipe constitute a heat exchange side, the working fluid flows through the heat exchange side via the inlet pipe and the outlet pipe, and the heat transfer fluid transfers heat energy to a circulating working fluid by means of indirect heat transfer using the heat pipe principle; the evaporation surface and the condensation surface of the heat transfer fluid in the heat absorber are on the same horizontal line, wherein the windshield encloses the flat heat absorber and the circulation pipeline, the circulation pipeline is provided inside the flat heat absorber, the flat heat absorbers are connected in parallel via the circulation pipeline, and each flat heat absorber is an independent light-absorbing heat transfer element.

8. The system according to claim 7, wherein the windshield comprises a wind-proof cover plate and wind-proof blades in close parallel arrangement;

the circulation pipeline comprises an inlet main branch pipe, an inlet annular pipe, an inlet main pipe, an outlet main branch pipe, an outlet annular pipe and an outlet main pipe, wherein the inlet annular pipe is provided with two inlet main pipes arranged opposite to each other, and the inlet annular pipe is vertically provided with a plurality of parallel inlet main branch pipes; the arrangement relationship among the outlet main branch pipe, the outlet annular pipe and the outlet main pipe is the same as the above-mentioned inlet main branch pipe, inlet annular pipe and inlet main pipe; the inlet annular pipe and the outlet annular pipe are parallel to each other, and the inlet main branch pipe and the outlet main branch pipe are arranged in one-to-one correspondence; the inlet main branch pipe comprises a branch pipe body, a branch pipe flange, a branch pipe branch and a branch pipe head, the structure of the outlet main branch pipe is the same as the above-mentioned inlet main branch pipe, and the branch pipe branch is connected to the inlet pipe and outlet pipe of the flat heat absorber via a thread or a flange, and can also serve as a bracket for fixing the flat heat absorber.

9. The system according to claim 7, wherein the diameters of the inlet main branch pipe, the inlet annular pipe and the inlet main pipe are smaller than the diameters of the outlet main branch pipe, the outlet annular pipe and the outlet main pipe; the distance between the inlet main branch pipe and the outlet main branch pipe corresponding to the same flat heat absorber is greater than the thickness of the flat heat absorber.

* * * * *